(12) United States Patent
Ebrahemi

(10) Patent No.: US 10,618,586 B2
(45) Date of Patent: *Apr. 14, 2020

(54) HANDLEBAR LIGHTS WITH TURN ACTUATOR

(71) Applicant: Daniel Ebrahemi, Sonoma, CA (US)

(72) Inventor: Daniel Ebrahemi, Sonoma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,336

(22) Filed: Jul. 8, 2019

(65) Prior Publication Data

US 2019/0359277 A1 Nov. 28, 2019

Related U.S. Application Data

(63) Continuation of application No. 16/101,218, filed on Aug. 10, 2018, now Pat. No. 10,392,068.

(60) Provisional application No. 62/634,708, filed on Feb. 23, 2018, provisional application No. 62/605,762, filed on Aug. 25, 2017.

(51) Int. Cl.
*B62J 6/02* (2020.01)
*B62K 21/12* (2006.01)
*B62J 6/00* (2020.01)
*B62K 19/40* (2006.01)

(52) U.S. Cl.
CPC .............. *B62J 6/02* (2013.01); *B62J 6/005* (2013.01); *B62K 19/40* (2013.01); *B62K 21/12* (2013.01); *B62J 2006/006* (2013.01)

(58) Field of Classification Search
CPC .. B62J 6/005; B62J 6/02; B62K 21/12; B62K 19/40
See application file for complete search history.

(56) References Cited

U.S. PATENT DOCUMENTS 8,325,027 B2 12/2012 Tee et al.

FOREIGN PATENT DOCUMENTS

WO WO 2014080168 A1 5/2013

*Primary Examiner* — Thomas M Sember
(74) *Attorney, Agent, or Firm* — Peter Tormey; Antero Tormey Petrin

(57) ABSTRACT

A bicycle including a handlebar attached to a frame at substantially a midpoint, a first set of light sources disposed to project light in a first forward direction, said first set of light sources including a fixed light source and a motor-controlled light source, disposed to project light in a second forward direction said second set of light sources including a fixed light source and a motor-controlled light source, a controller, said controller disposed on the handlebar, said controller coupled to the first set of light sources and the second set of light sources, a rotation sensor operable to sense movement of the handlebar relative to the frame, said rotation sensor coupled to the controller, wherein the motor-controlled light sources move in response to the position of the rotation sensor.

17 Claims, 12 Drawing Sheets

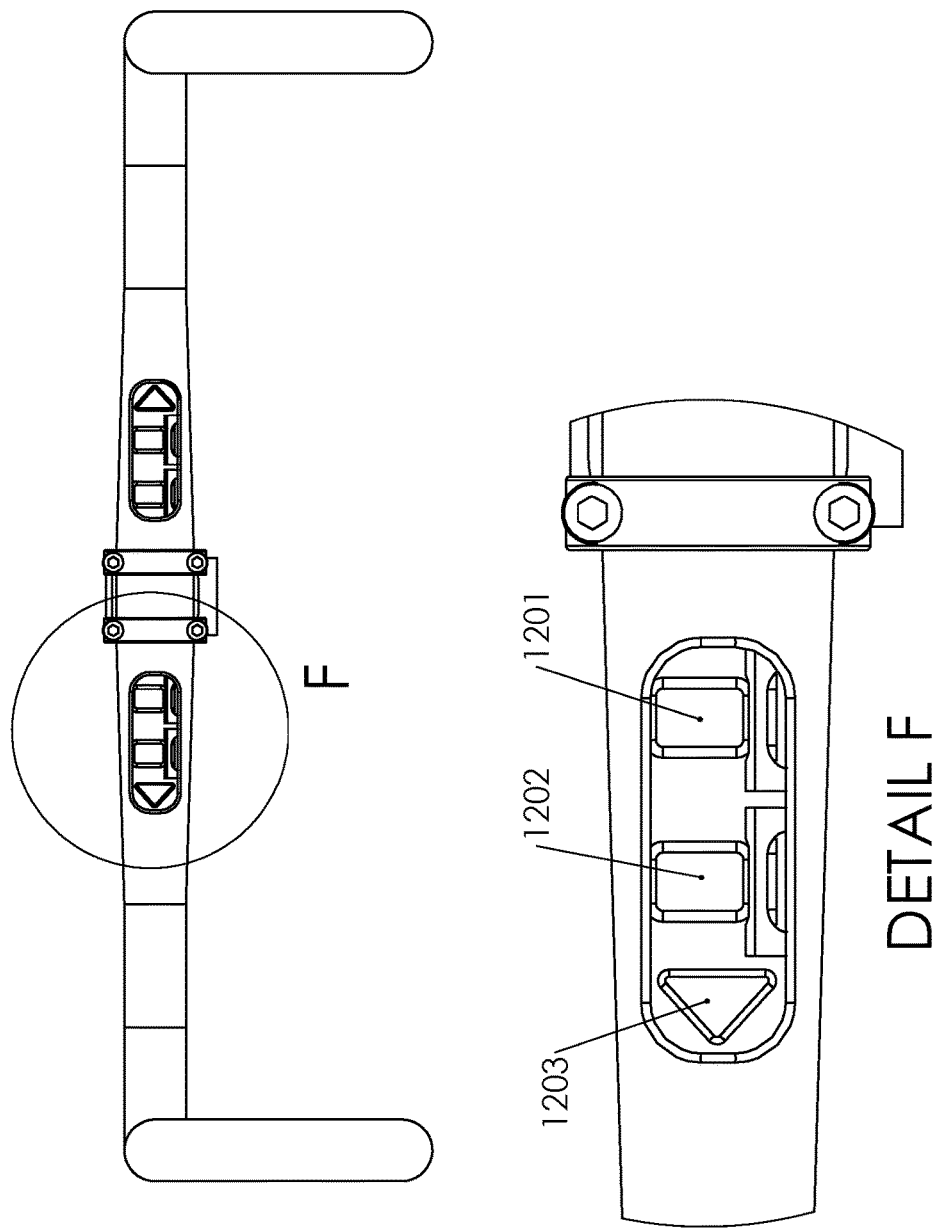

HANDLEBAR LIGHTS WITH TURN ACTUATOR

PRIORITY

This application claims the benefit of co-pending application Ser. No. 16/101,218 filed Aug. 10, 2018 which further claims the benefit of provisional patent application 62/634,708 (filed Feb. 23, 2018) and 62/605,762 (filed Aug. 25, 2018), all three of which are incorporated by reference as if fully set forth herein.

TECHNICAL FIELD

This patent involves Bicycle electronic lights and bicycle handlebars, in the field of transportation and recreation.

BACKGROUND

Bike lights are both useful at night and daytime to allow the rider to be visible and thus increase their safety and lower their risk of injury.

SUMMARY

Disclosed herein is a bicycle including a handlebar attached to a frame at substantially a midpoint. There is also a first set of light sources on one side of the handlebar and operable to project light in a first forward direction. The first set of light sources may include both a fixed light source and a motor-controlled light source, disposed to project light in a forward direction said second set of light sources which may include a fixed light source and a motor-controlled (or motion actuated) light source. A controller disposed on or in the handlebar is coupled to the first set of light sources and the second set of light sources, and a rotation sensor or gauge. The rotation sensor is operable to sense movement of the handlebar relative to the frame and control the motor-controlled light sources move in response to the position of the rotation sensor. In operation, as a cycle rider turns the handlebars, the light sources would illuminate the path in the direction of travel.

Various embodiments may provide for illuminating both the direction of impending travel and the direction of current travel, so that the fixed light and motor-controlled light sources light different areas. Some embodiments may employ solar charging, and/or detection of on-coming light to change to a normal low beam from a high beam.

In one exemplary embodiment, the handlebar might include a usage adjustment. For example, and without limitation, "rock/trail terrain" so that it senses the riders riding pattern using software and hardware and adjusts the light mode and stiffness of the up/down movement and left/right movement with the road conditions of the biker, thus detecting the riding pattern/behavior and adjusts the output accordingly.

BRIEF DESCRIPTION OF DRAWINGS

FIG. 12. Shows an example Bar Assembly for road bike in Detail View.

DESCRIPTION

Generality of Invention

Figure 1:
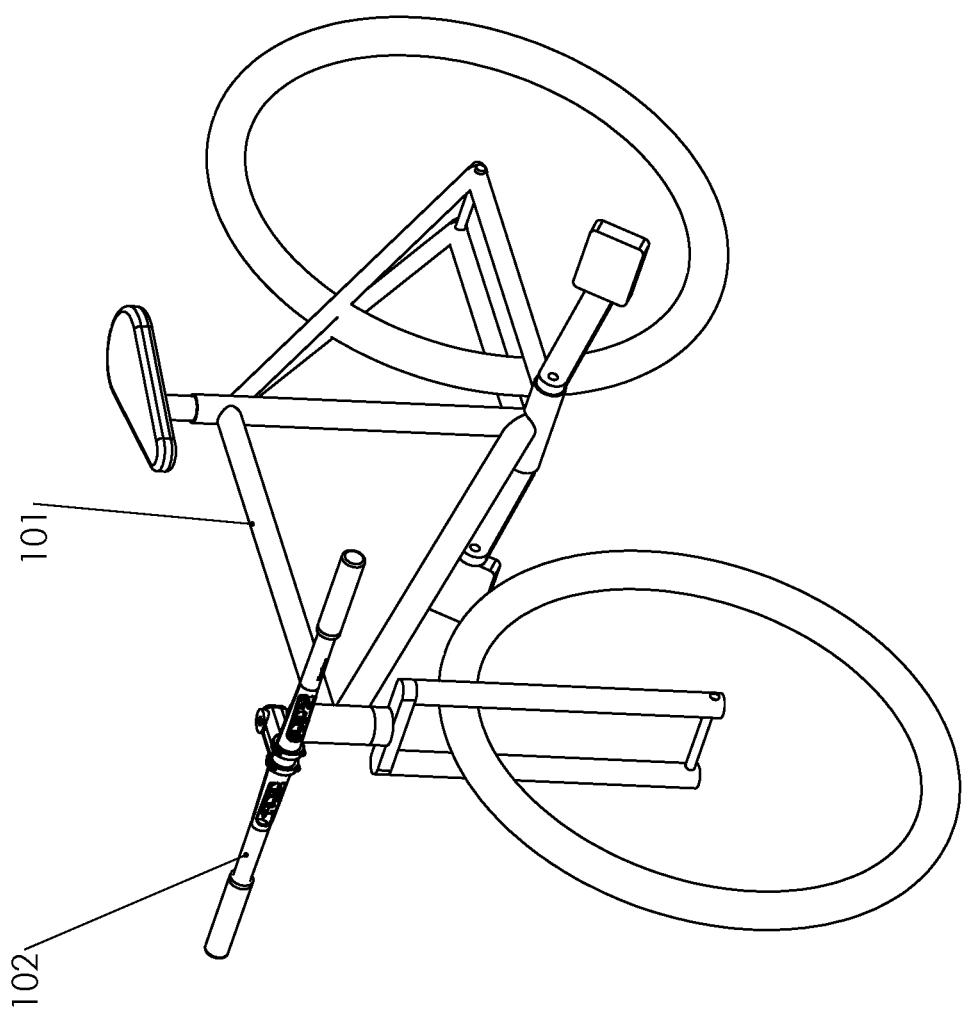
FIG. 1. Shows an example Overall Assembly in isometric view.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example, and without limitation, in cases in which a measure or value is "relatively increased" or "relatively more", that comparison need not be with respect to any known measure or value but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

The FIG. 1 shows an example overall system of the handle bar assembly 102 installed on the bicycle 101.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effectuate such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
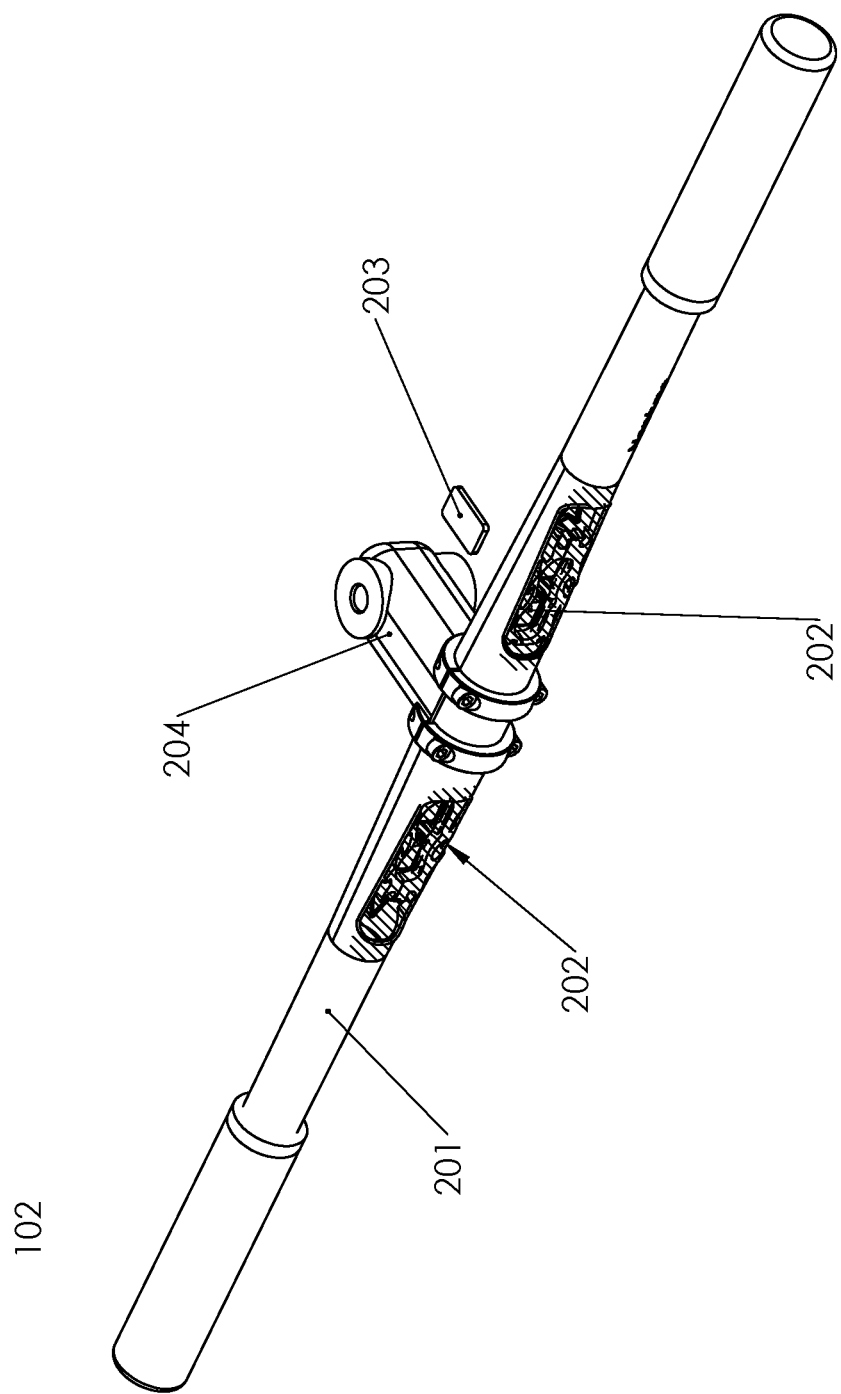
FIG. 2. Shows an example Bar Assembly in isometric view.

FIG. 2 shows a view of the Handle Bar assembly 102. The handlebar 201 is the main support structure. The Bar assembly may be assembled with a split at the center or detachment anywhere along length of bar in order to permit access to insert the internal components during manufacturing. The bar 201 may be made with a variety of materials, but not limited to, aluminum, steel, stainless steel, metal, wood, carbon fiber, or plastic and any combination of those. The bars 201 can be treated, but not limited to, painted, anodized, electro-plated, sandblasted, bead-blasted, or any combination thereof. The bar can house two light assemblies 202, for example on the left and right sides. The light sources 502, 507, 505 are contained inside the bar or in cavities in the bar in order to reduce the protrusion of the lights, giving a smaller envelope size and reducing aerodynamic drag during use. The light source 502, 507, 505 may be incandescent, light emitting diodes (LEDs), halogen, fluorescent, or other suitable form to provide lights. Alternatively, or additionally, the system could have alternative lights pointed to side 502 or angled away from the main focus beam of the primary lights 507. There can be one light 502 each for left and right sides, or a multiple array of lights for each left/right side.

The windows 202 are shaped a certain way because they allow the most projected area for light dispersion while minimizing the handlebar envelope. The window cutouts are constrained by the handlebar stem mount, brake levers, and gear shifters. The window cutouts are sized in width and height to maximize light dispersion while allowing for sufficient stiffness and strength of the handlebar under user load. The protective windows 202 can be curved in one or two directions. The clear protective window housings 202 can be plastic or glass or any transparent or light passing material. The protective housing 202 can also be frost treated to act to diffuse the light emitting from the handlebar.

The stem 204 clamps the handlebar 201 in a rigid fashion. In one example a rotation sensor 203 is mounted on the bicycle frame. The sensor can be used for measuring the twist angle of the handlebar.

Figure 3:
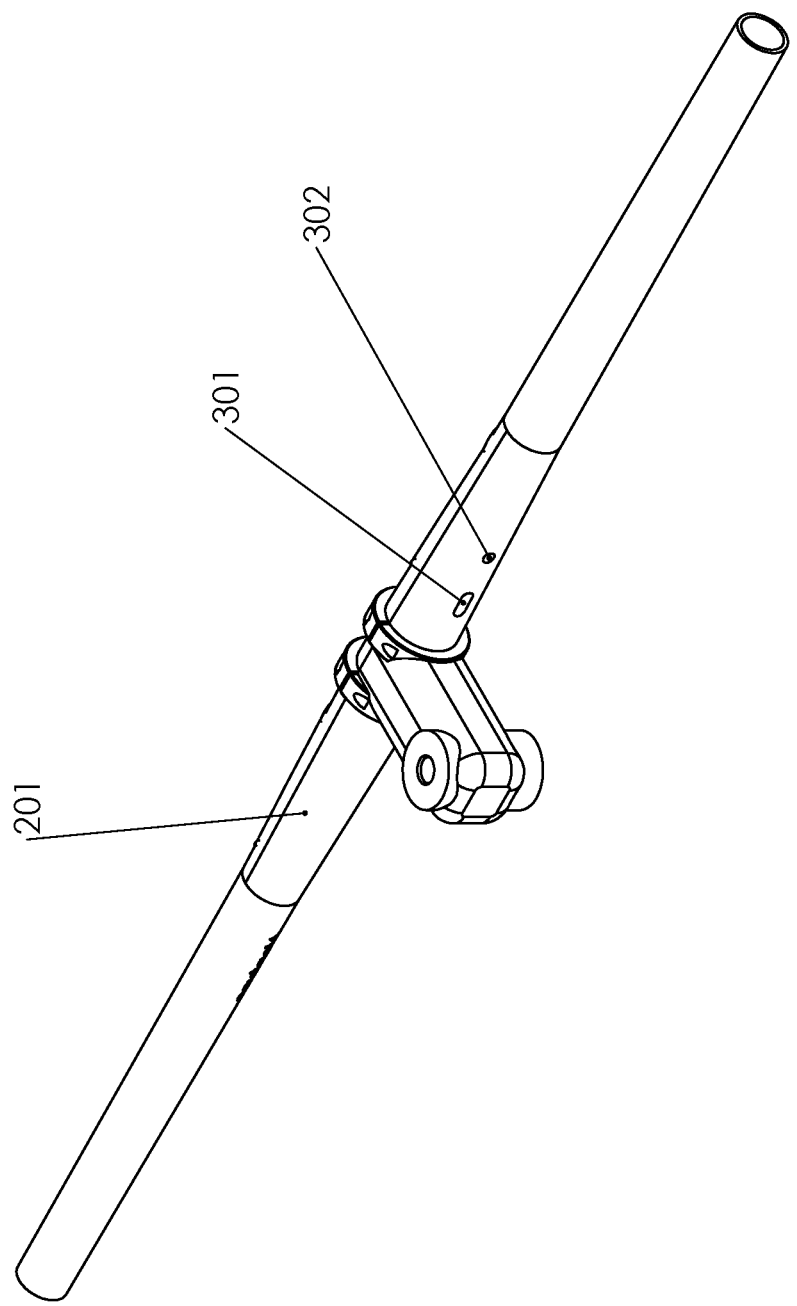
FIG. 3. Shows an example Bar Assembly in isometric view.

FIG. 3 shows an example back view of the handlebar 102. There can be a charge connector 301. The unit's battery 501 may be charged through a charge port 301 which may be USB, DC, or AC adaptable, and has a protective cover. The unit 102 is waterproofed to shield the handlebar unit from outdoor use, rain, and water. Waterproofing includes the parts around the light windows 202, the charge port 301, the button port 302, and the interfaces between assembled parts of the handlebar.

The user button 302 on the bars allows the user to turn the system on and off, and change light modes, and other functionality.

Figure 4:
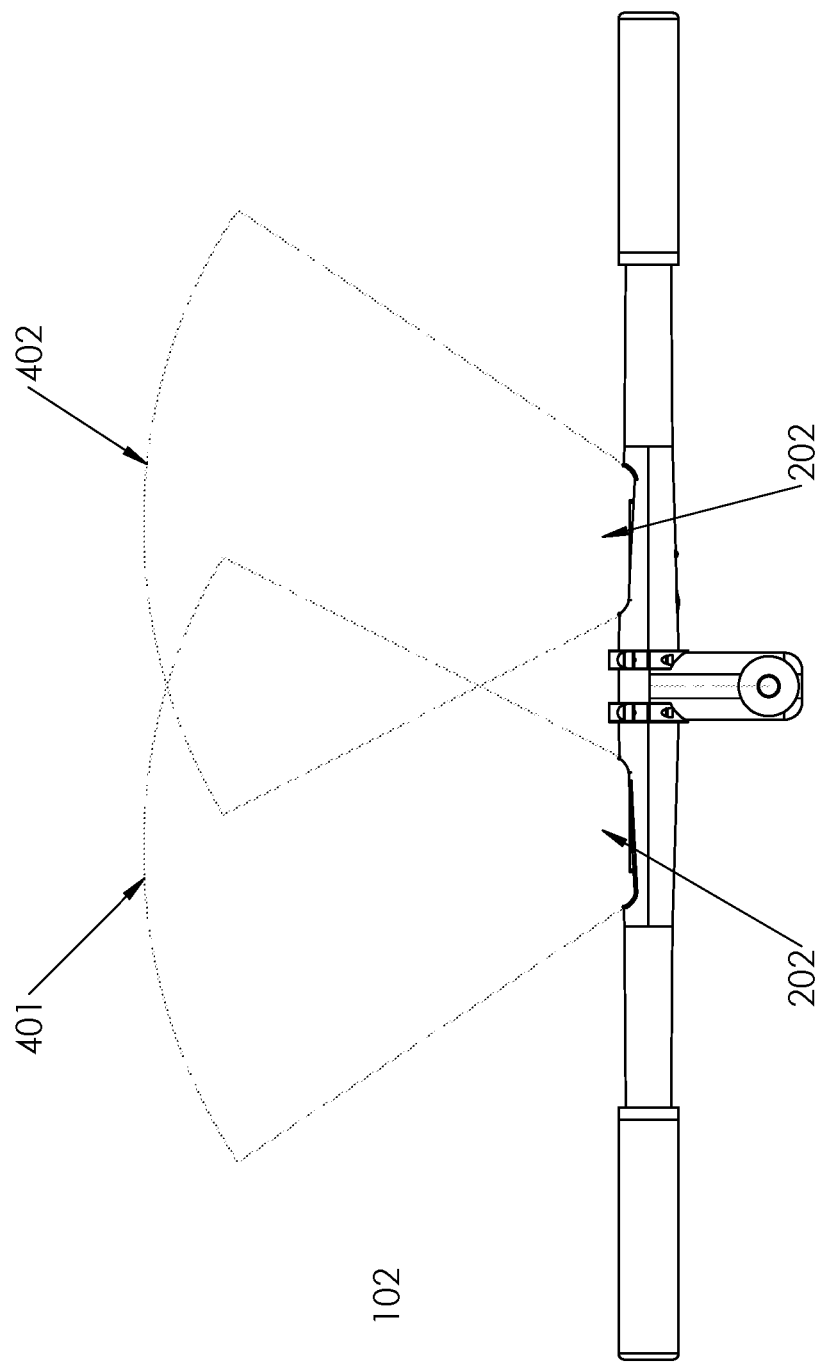
FIG. 4. Shows an example Bar Assembly in Top View.

FIG. 4 shows an example operation of the product 102 in the Top View. The light assemblies 202 emit light in a dispersed cone shape 401 on the left and 402 on the right. The primary lights 507 and secondary lights 502 rotate from side to side and also up and down based on the user turning the handlebars, where the lights can track with the twist of the handlebars in sync. In another embodiment, the lights 502 may turn in front of the twist or lag the rotation input of the handlebar 201. The lights 502 are able to move based on motor actuation according to user input through electronic sensing coupled with software control algorithms or control circuitry on the circuit board.

Figure 5:
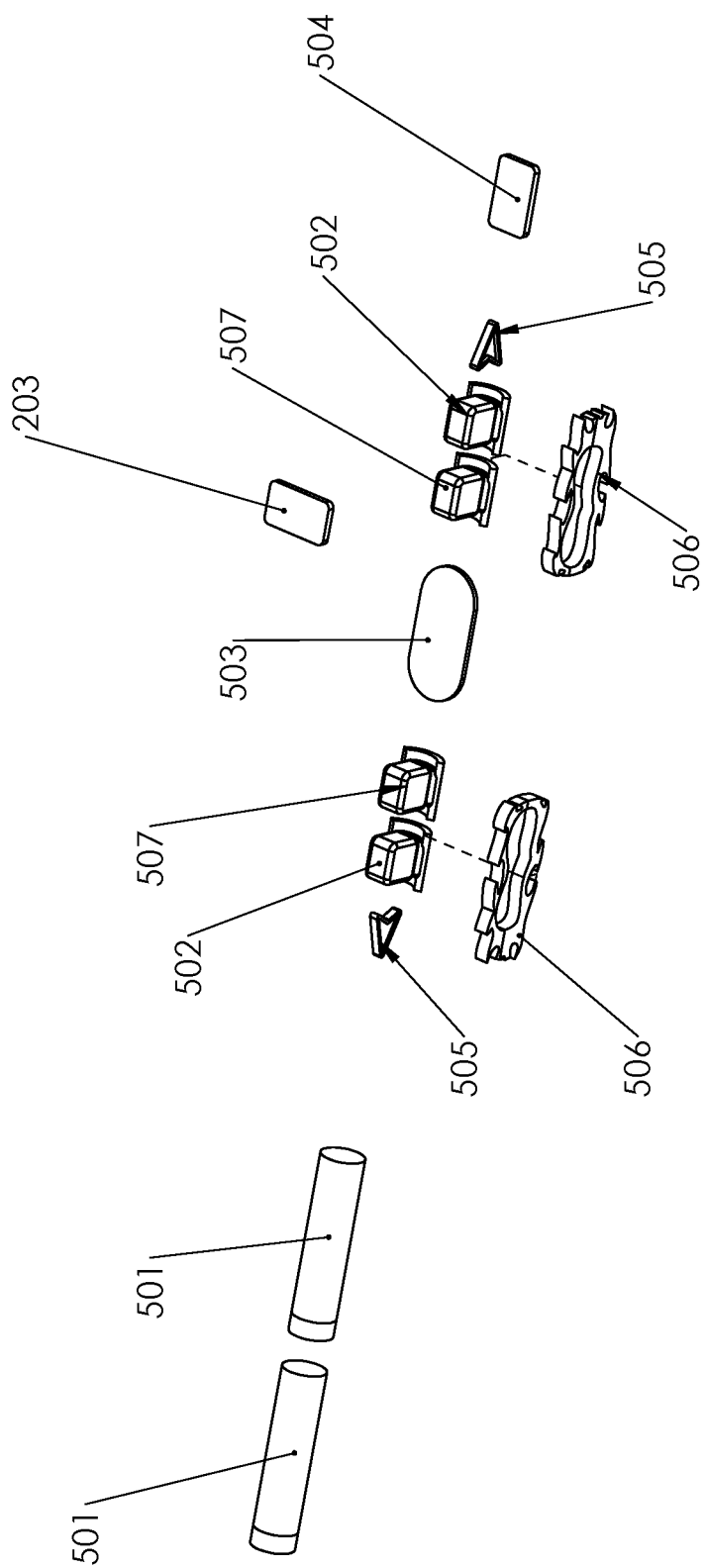
FIG. 5. Shows an example of Bar Assembly in Internal Exploded View.

FIG. 5 shows example internal parts of the handlebar assembly 102. The batteries 501 can be rechargeable such as lithium iron phosphate, lithium ion, lithium metal, lead acid, nickel metal hydride, or non rechargeable such as alkaline. The batteries can be any combination of series and parallel from one to ten batteries in the module.

The Light Modules 507 and secondary lights 502 contains a light source, motor, heat sink, and mounts for the left and right sides. The lights 507 and 502 may be LED, incandescent, halogen, xenon, and the like. The lights are in contact with a thermal heat-sink to dissipate the local heat generated from the lights. The heat-sinks can be made of metal such as steel or aluminum or ceramic material. The heat-sink could also be water cooled in other embodiments. Each light module is mounted onto a turning motor which could be a for example stepper, micro stepper, servo, DC motor, or actuator. The turn signal light 505 is a light indicator for signaling left and right turns for the user. On the front facing screen/light module of our actual product there can be an arrow for Left and Right turn signals that are unlit during normal riding and that can only be activated to flash either left or right when the rider is riding for example, and taps a section of the brake lever (or use a small button), or a push sort of button/sensor on the handle part of the bar pointing down so that it is not noticeable yet easy for riders to access when riding and wanting to turn right or left. When users "activate" turn signal the arrow will flash either white, blue, red, green, (can be any color of the rainbow essentially) etc in the direction that they choose to hit the button (right or left), so that oncoming riders, pedestrians, cars, motorcycles will know that a bike is coming. In addition, while this lighted arrow is lighted and doing its job, our original invention idea of the lights turning with the handlebar will also be working in sync with the signal arrow, adjusting up and down/left to right.

In one exemplary embodiment, there can be two light shapes in each side of the handle bar (left and right sides of the bar), where one of the lights can turn left and right movement and where one of the smaller lights for example can act as a guide to keep looking straight ahead and somewhat down so riders can see the road floor underneath for rider safety.

The accent light 506 can be always on or turn off at certain times. It has a plastic light-pipe to disperse the light and act as visual interest to the product. There are many shapes and styles of the accent light 506 possible.

The component parts will be adequately life tested to make sure that they will not fall apart, break/deteriorate, fog, fail etc. even after five years of use for example. The internal electronics and components should well supported and reinforced to the inner upper and lower edge of the handlebar inside, and not come loose or rattle during operation.

An example control circuit board 503 ("PCB") controls the signal which actuates the lights and manages power to the battery. The control circuit board may include a microcontroller, a processor, or similar circuitry. A turn angle sensor (or rotation sensor) 203 can be mounted on the frame outside of the handlebar 201. Alternatively, a turn angle sensor 504 can be mounted inside of the bar 201 to measure relative turn angle. The twist Sensors 203 could be inside the bar or attached to the handlebar 201 or bicycle frame 102, and connected to the PCB board with wires. The sensors measure relative rotation twist of handlebars and allow the system to act in response to the handlebar twist. The sensor could be a pair of accelerometer/gyros, inertial measurement unit (IMU), or potentiometers or rotary encoder, to measure angle twist of the bars relative to the frame. The sensor must measure angle relative to the frame by containing a fixed mount to the frame which defines the center or home position of the handlebar twist angle.

In another embodiment there can be an option to include a solar cell or panel so in case a rider forgets to charge the USB and is riding at night the system will have sufficient power. If the battery dies, solar panel or cell provides power to system. Also the sensor picks up the night style riding and automatically turns on when the environment gets dark. Also the system should turn on with small switches and have different mode settings and color changes if a rider wants.

Figure 6:
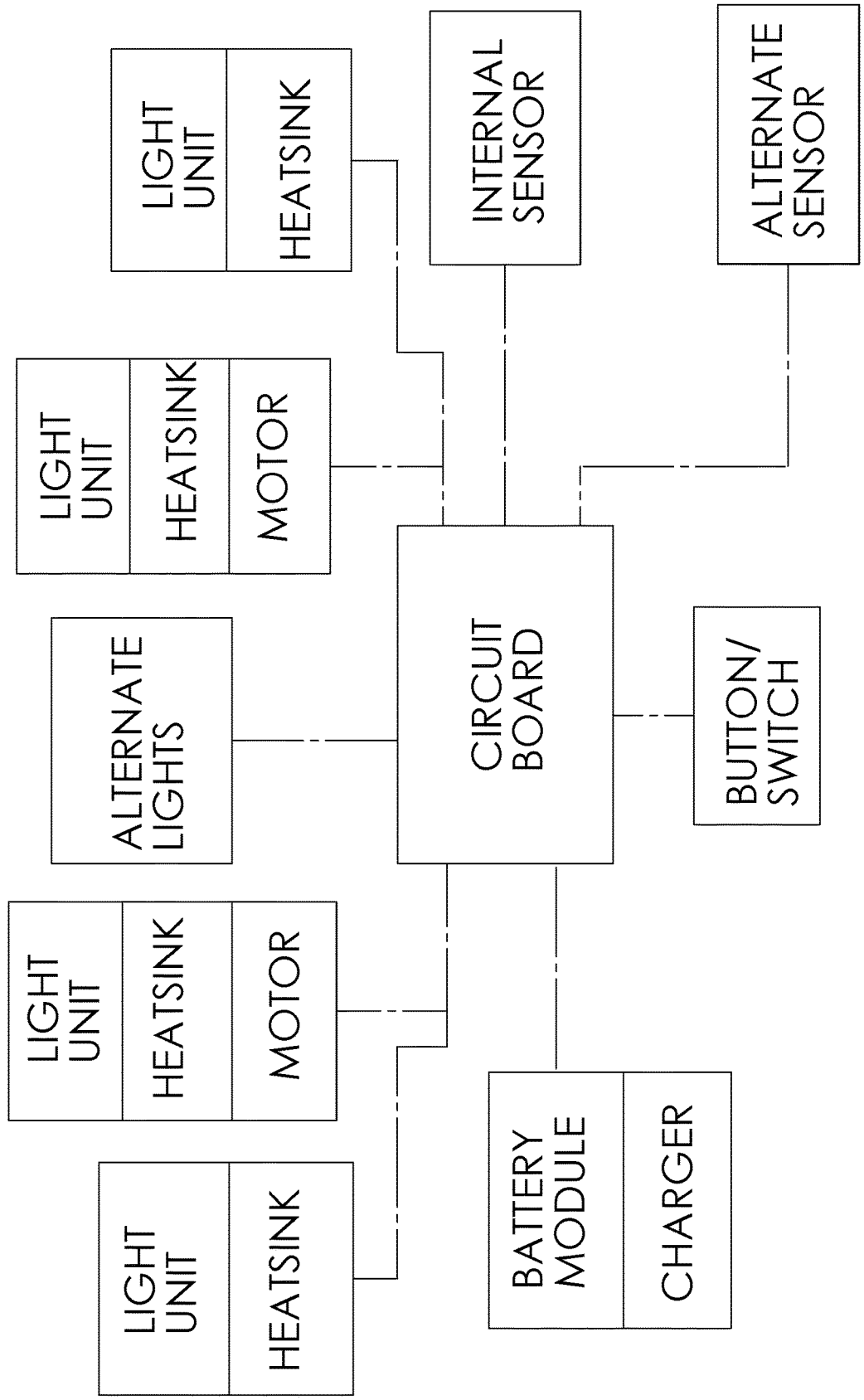
FIG. 6. Shows an example Electronics Schematic in Plain View.

FIG. 6 shows an example electronic circuit diagram for the handlebar 102. The circuit board takes inputs from the Internal and Alternate sensors, performs an algorithm with embedded software, and outputs signals to the light motors and light modules (primary, secondary, and accent lights). Power from the batteries 501 supports the system for the user to operate the product. The charger supplies energy to the battery module. A button or switch can turn the system on/off and also change light modes. Many software algorithms are possible. In one embodiment the light will adjust to high beam/high intensity mode when there is no oncoming traffic or biker/motorcycle or any other kind of light from the opposite side of traffic, and as soon as the sensor detects that then the lights adjust to normal low beam intensity for example.

In another embodiment, alternate sensors may include a microphone for voice recognition features taking user voice commands as inputs and output behavior of the light modules including motion and brightness settings. In some embodiments, a programmable controller could reference common voice commands from local storage of voice characteristics. Voice commands may allow for changing to high beams, or for turn signal actuation.

In another embodiment, the software can have a road condition setting for example, "rock/trail terrain" so that it automatically senses the riders riding pattern using software and hardware and adjusts the light mode and stiffness of the up/down movement and left/right movement with the road conditions of the biker. In other words, the system detects, using on-board sensors such as accelerometers, the riding pattern/behavior and adjusts the output accordingly with hardware and software according to programmed routines, such as dampening an input from a rotation sensor.

Figure 7:
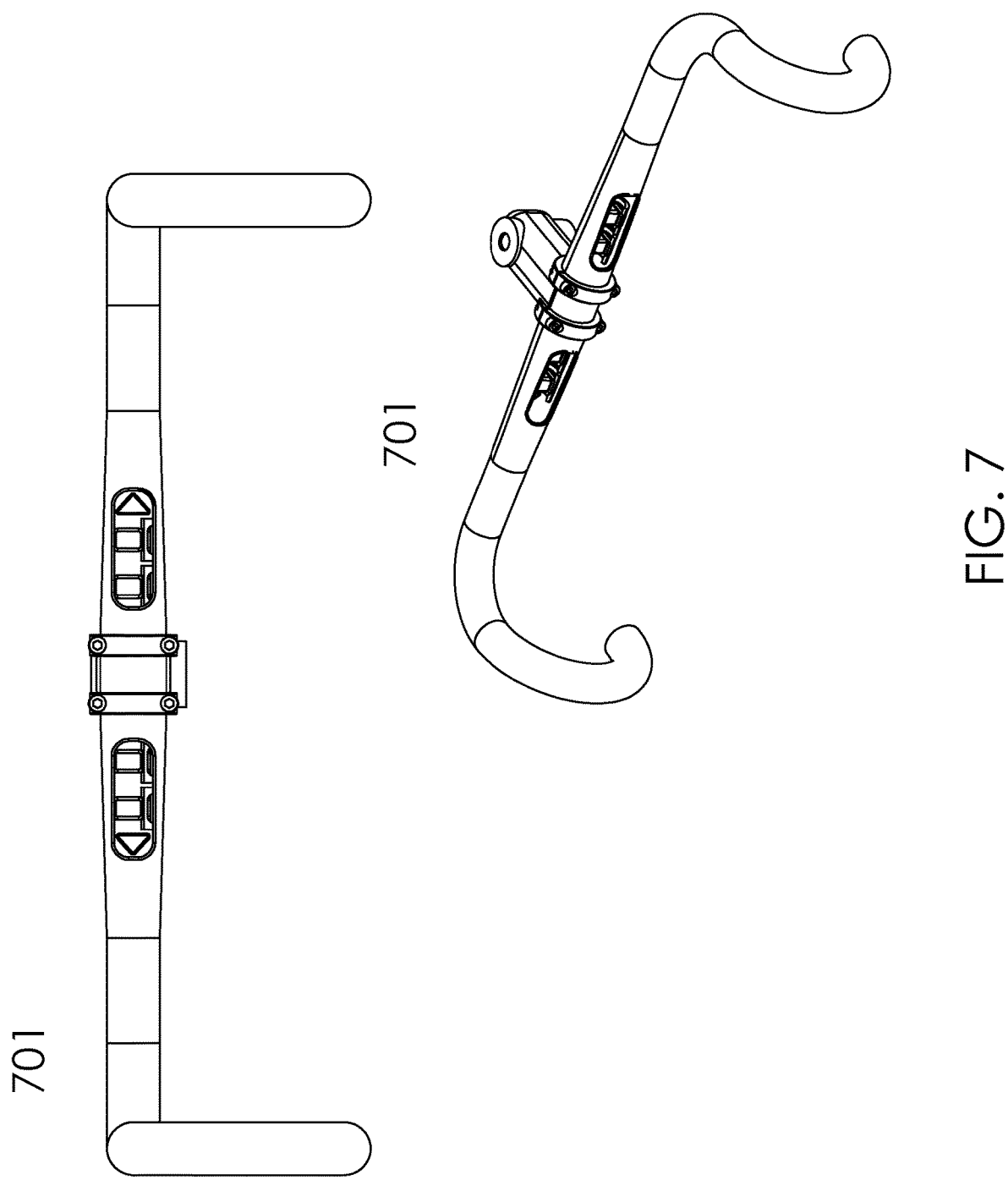
FIG. 7. Shows an example Road style bar in Front, Isometric View.

Other handle bar shapes besides mountain bike style are possible and applicable. In FIG. 7 an example road bike bar 701 is shown in the front and isometric views. The road bike handlebar usually has less enclosed volume to fit the electronics and lights, compared to the mountain bike handlebar.

Figure 8:
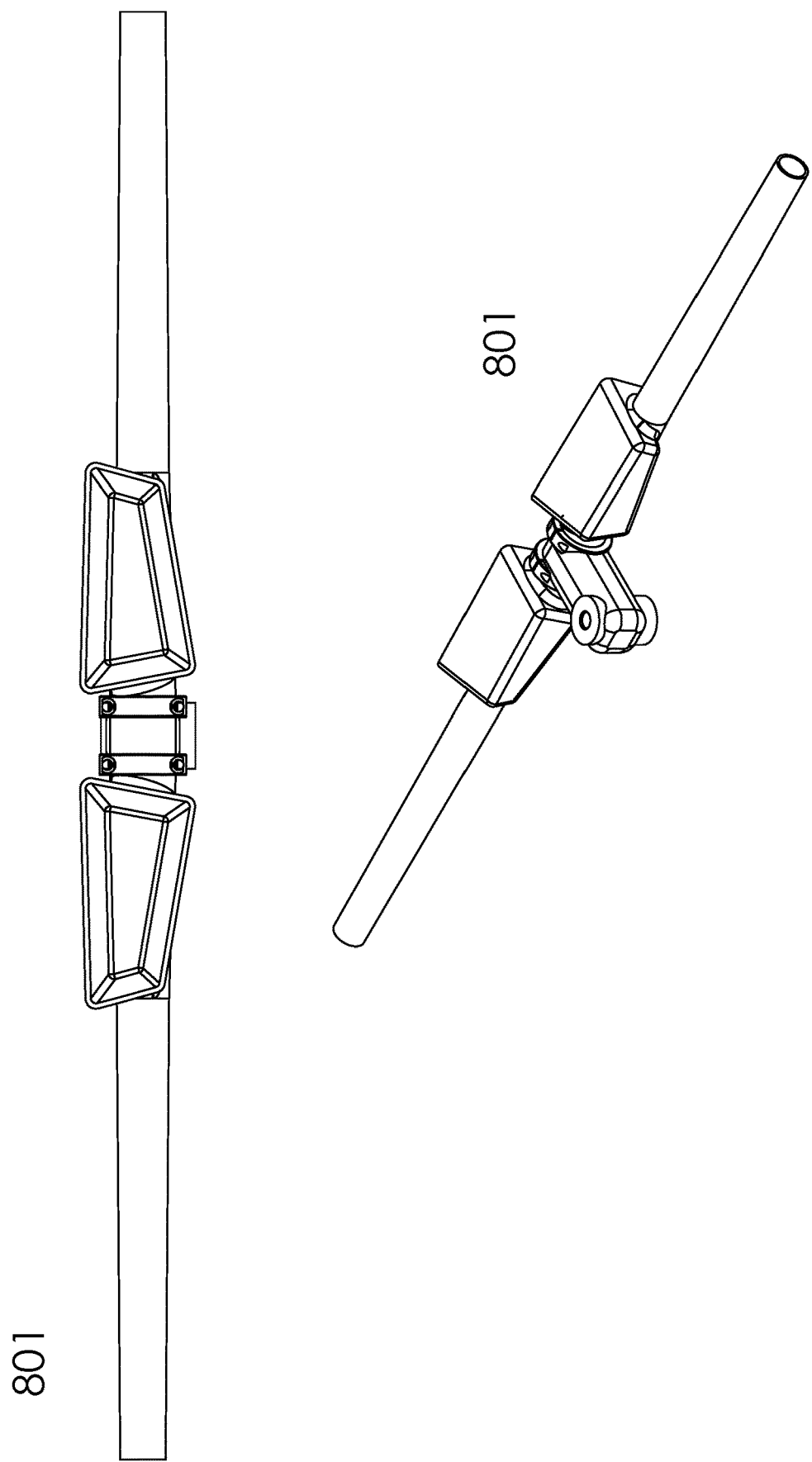
FIG. 8. Shows an example Cavity style bar in Front, Isometric View.

In another embodiment, the standard handlebar envelope is expanded to give more room for the light modules. In FIG. 8 an example handlebar 801 is shown with expanded mount cavities for the light modules. Many shapes of cavity or handlebar shapes are possible.

There can be various shape embodiments: mountain bike handlebar, road bike, kid bike, cruiser bicycle, tricycle, moped, electric bicycle, electric scooter (two or three wheeled) pedal scooter, skateboard, etc. Also the technology can be embodied into virtually anything that moves, ex: Mountain bikes (trail, electric, downhill, cross-country, fat tires, BMX, dirt jump), Road bikes (performance, adventure and gravel, cyclocross, triathlon), Fitness bikes (commute, speed, comfort), Electric bicycles (mountain or pavement), strollers, jet skis, boats, surfboard, boogie board, golf cart, rides, roller coasters, bumper cars, private planes, charter planes, snowboards, etc.

Figure 9:
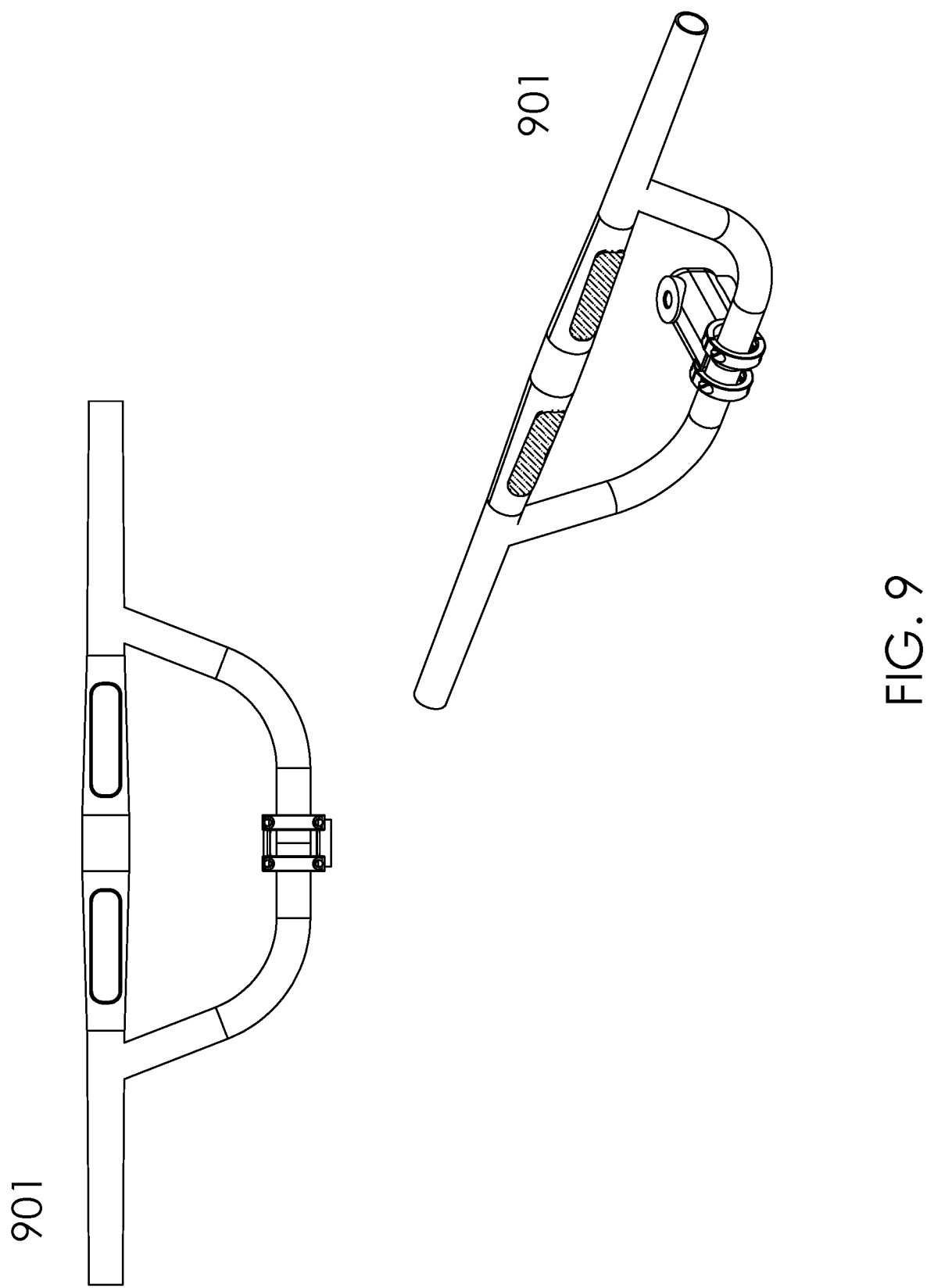
FIG. 9. Shows an example Kid style bar in Front, Isometric View.

FIG. 9 shows an example kid or child style handlebar 901. Child safety is a critical parameter for young aged users. The bar system 901 can contain any combination of the primary light 507, secondary lights 502, accent lights 506 and turn signals 505.

Figure 10:
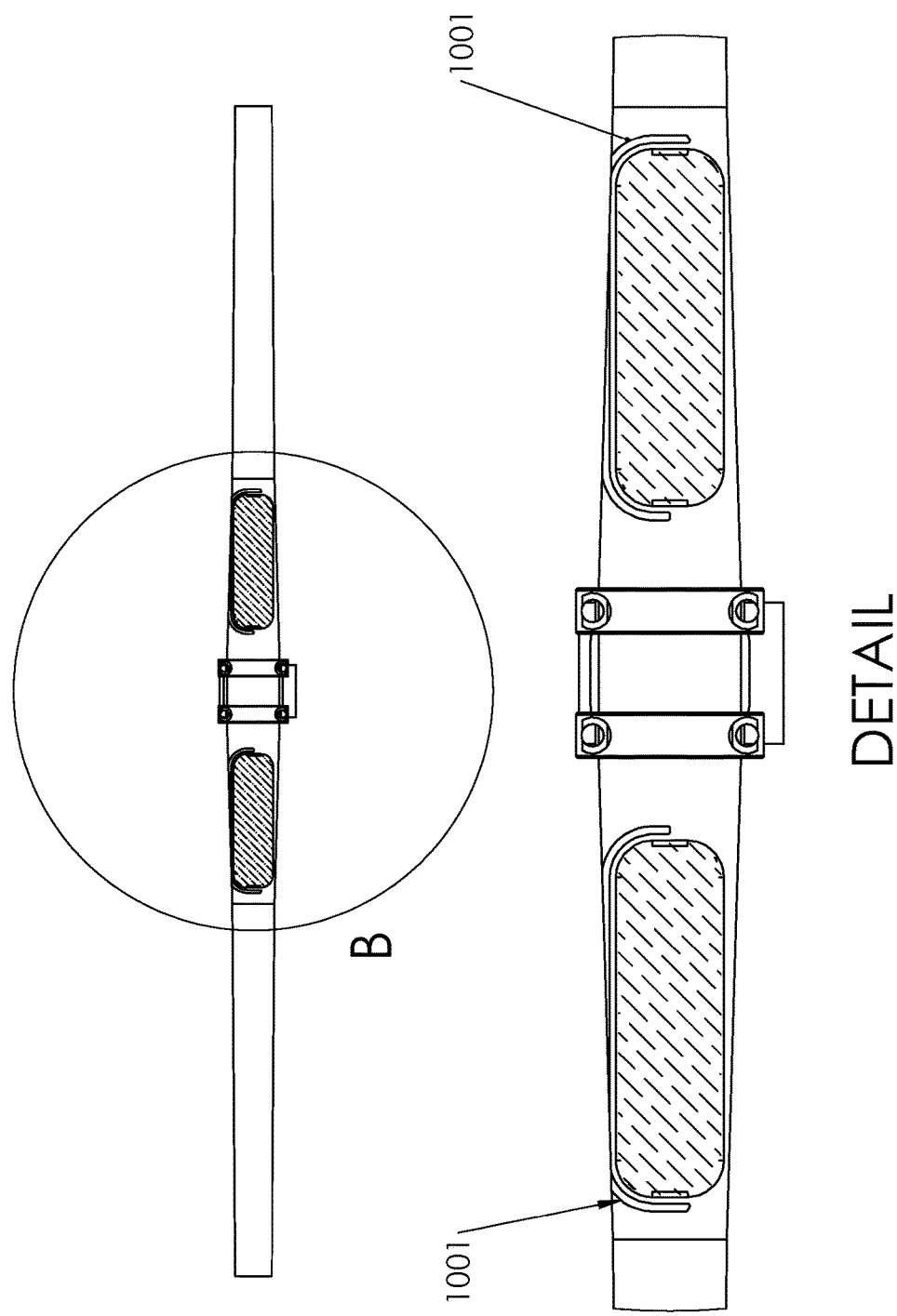
FIG. 10. Shows an example Bar Assembly with Alternate Lights in Detail View.

FIG. 10 shows an alternative light module. The system could have alternate lights set 1001 which are dim or always on.

Figure 11:
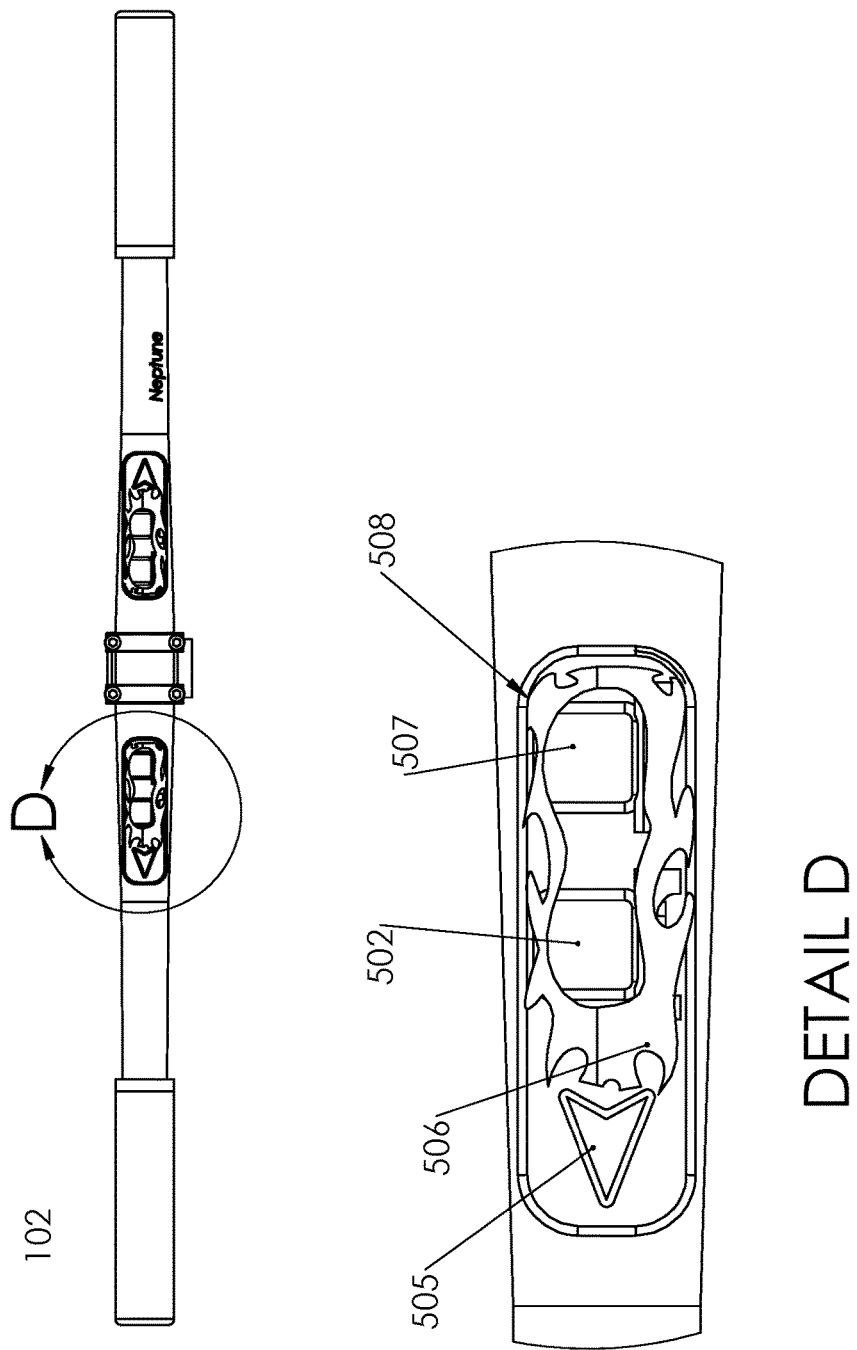
FIG. 11. Shows an example Bar Assembly in Detail View.

FIG. 11 shows a detail view of the light module with primary light 507, secondary lights 502, accent lights 506 and turn signals 505. There can be a rubber gasket 508 or trim piece to act as a visual accent or water ingress protection around the window 202.

FIG. 12 shows a detail view of the light module with primary light 1201, secondary light 1202, and turn signal 1203. There can be a rubber gasket 508 or trim piece to act as a visual accent or water ingress protection around the window 202.

The structure and techniques of present disclosure may, in some embodiments, include lights installed in pedals, seat back, and on the rear frame (in the "rear triangle" portion) of a bicycle.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A bicycle including:
a handlebar, said handlebar attached to a frame at substantially a midpoint of the handlebar;
a first light source disposed a first lateral direction from the midpoint and further disposed to project light in a first forward direction, said first light source including a motor-controlled, moveable light source;
a second light source disposed a second lateral direction from the midpoint, and further disposed to project light in a second forward direction said second light source including second motor-controlled moveable light source;
a controller, said controller disposed, at least in part, in the handlebar, said controller coupled to the first light source and the second light source;
a rotation sensor operable to sense movement of the handlebar relative to the frame, said rotation sensor coupled to the controller,
wherein the controller operates the motor-controlled light sources in response to a position of the rotation sensor.

2. The bicycle of claim 1 wherein the motor is a servo-motor and the controller includes a servo-motor drive circuit.

3. The bicycle of claim 1 wherein the light sources operate at a different intensity.

4. The bicycle of claim 1 wherein the handlebar includes a hollow portion and the first and second light sources are substantially disposed in the hollow portion.

5. The bicycle of claim 1 wherein the controller is programmable and includes non-transitory, controller instructions directing the controller to perform a method including:
receiving a signal from the rotation sensor, said signal indicative of a position of the handlebar relative to the frame, and
controlling the moto-controlled light sources in response to the signal from the rotation sensor.

6. The bicycle of claim 5 further including:
A microphone, said microphone coupled to the processor, wherein the method further includes receiving an audio signal and controlling the light sources in response to the audio signal.

7. The bicycle of claim 5 wherein the method further includes:
receiving a road condition setting;
receiving an accelerometer input, and
controlling the motor-controller light sources in response to the road condition setting and the accelerometer input.

8. The bicycle of claim 7 wherein said controlling includes dampening an input from the rotation sensor.

9. The vehicle of claim 1 wherein the light sources operate at a different intensity.

10. The bicycle of claim 1 wherein the frame includes a hollow portion and the first and second light sources are substantially disposed in the hollow portion.

11. A handlebar including:
a hollow core inside the handlebar extending for a portion of a length of the handlebar;
an opening in the handlebar, said opening exposing an interior of the handlebar;
a control circuit disposed in the interior;
a rotation gauge electronically coupled to the control circuit;
a light source, said light source disposed on a motion-controlled actuator and further disposed to allow light from the light source to illuminate through the opening in the handlebar, said light source and motion actuator electronically coupled to the control circuit.

12. The handlebar of claim 11 wherein the moveable beam moves in response to information from the rotation gauge.

13. The handlebar of claim 11 wherein the motion actuator is a stepper motor.

14. The handlebar of claim 11 wherein the light source is an LED.

15. The handlebar of claim 11 wherein the control circuit includes a programmable device operable to receive an input from the gauge and control the motion actuator.

16. A vehicle including:
a frame, said frame including a fixed portion and a substantially rotatable portion;
a rotation sensor operable to sense movement of the fixed portion of the vehicle relative to the rotatable portion of the vehicle;
a controller, said controller coupled to the rotation sensor and disposed, at least in part, in the frame, said controller coupled to a first light source and a second light source; said first light source including a first motor-controlled, moveable light source, said second light source including a second motor-controlled moveable light source;
wherein the controller operates the motor-controlled light sources in response to a position of the rotation sensor.

17. The vehicle of claim 16 wherein the first and second motor are servo-motors and the controller includes a servo-motor drive circuit.

* * * * *